United States Patent [19]

Eastman

[11] 4,380,154
[45] Apr. 19, 1983

[54] CLEAN COAL POWER SYSTEM
[75] Inventor: George Y. Eastman, Lancaster, Pa.
[73] Assignee: Thermacore, Inc., Lancaster, Pa.
[21] Appl. No.: 276,655
[22] Filed: Jun. 23, 1981
[51] Int. Cl.³ .................................................. F02C 1/10
[52] U.S. Cl. .................................. 60/682; 165/104.16; 60/39.464
[58] Field of Search ......... 60/39.12, 39.18 B, 39.46 S, 60/671, 682; 431/7, 170; 165/104.16

[56] References Cited
U.S. PATENT DOCUMENTS

| | | | |
|---|---|---|---|
| 3,723,073 | 3/1973 | Conti | 23/293 |
| 3,834,171 | 9/1974 | Johansson | 62/3 |
| 3,871,172 | 3/1975 | Villiers-Fisher et al. | 60/39.02 |
| 3,911,683 | 10/1975 | Wolf | 60/641 |
| 4,082,575 | 4/1978 | Eastman | 165/133 |
| 4,160,720 | 7/1979 | Seader et al. | 201/31 |
| 4,165,614 | 8/1979 | Yeh | 60/531 |
| 4,228,659 | 10/1980 | Cowther | 60/682 |
| 4,249,594 | 2/1981 | Elkins et al. | 165/DIG. 2 |
| 4,326,373 | 4/1982 | Giles | 60/682 |

Primary Examiner—L. J. Casaregola
Attorney, Agent, or Firm—Martin Fruitman

[57] ABSTRACT

A coal burning power plant which produces electricity at high efficiency and with very low levels of atmospheric contamination. A fluidized bed of limestone and coal is used to burn the coal with little air pollution, and a large quantity of specially constructed heat pipes transfer the heat to a closed cycle gas turbine with very low temperature loss. The preferred embodiments of the heat pipes are constructed with steel casing, have a thin aluminum oxide layer on their surfaces to prevent hydrogen permeation into the casing and have a plasma sprayed coating of ceramic on the portion within the fluidized bed to prevent erosion of the heat pipe casing by the solid particles within the bed.

13 Claims, 4 Drawing Figures

CLEAN COAL POWER SYSTEM

SUMMARY OF THE INVENTION

This invention deals generally with power plants and more specifically with a coal burning plant which drives a closed cycle gas turbine by means of heat transfer with an array of heat pipes.

While fluidized bed combustors have been used in the prior art as shown in U.S. Pat. No. 3,871,172 by Villiers-Fisher, et al., and while closed cycle engine generators are known within the power generating field, efficient heat transfer between these two systems has remained a challenge. Heat pipes, which have been used to advantage in many other heat transfer applications have not been anticipated for use in the fluidized bed application because of the high rate of deterioration and damage from immersion of a heat pipe within the fluidized bed.

The fluidized bed using limestone or dolomite is the leading solution to the need for the combustion of sulphur-bearing coals without the emission from the stack of gaseous sulphur compounds which are ecologically damaging. Instead, the sulphur contained in the coal reacts chemically with the limestone to form solid compounds which are readily removed with the ash residue of combustion.

For optimum capture of sulphur from coal, a limestone fluidized bed must be operated within a relatively narrow temperature range, roughly 1500°-1700° F. One of the major problems in the use of limestone fluidized beds is the control of bed temperature in spite of the widely varying power demands which characterize practical commercial power generating systems.

It is a characteristic of closed cycle gas turbines, as opposed to vapor turbines or open cycle gas turbines, that the variation in power output is accomplished by varying the pressure of the working gas rather than its temperature. The effect is to permit the heat source which heats the gas to operate at a relatively constant temperature regardless of variations in power demand. The present state of the art in turbine technology permits high efficiency operation in the 1400°-1700° F. temperature range.

This correspondence between the optimum operating characteristics of limestone fluidized beds and closed cycle gas turbines has been widely observed and is the subject of active development work. The problem lies in the abrasive character of the coal combustion gases. If, as they leave the fluidized bed, these hot gases are ducted directly through the turbine, they are found to carry along appreciable quantities of solid particles of fly ash from the coal and limestone. These particles rapidly erode the turbine blade materials, leading to catastrophically reduced operating life and reliability.

A conventional heat exchanger can be placed between the combustion gas and the turbine working gas to allow the heat to pass to the turbine but exclude the abrasive particles, but two disadvantages are seen to exist for this solution to the problem. First, the heat exchanger is subject to erosion and clogging by the abrasive particles. Furthermore, in most commercial heat exchangers, the puncturing of the exchanger membrane in even one place will permit the abrasive particles to leak into the turbine or permit the turbine working gas to escape. Either represents a complete system failure. A heat exchanger is needed which minimizes the effects of abrasion and clogging. Second, the insertion of the heat exchanger in the thermal path causes a temperature loss and results in decreased turbine power output. A high efficiency, low temperature loss, heat exchanger is required.

The present invention makes use of a high efficiency, high reliability heat exchanger using heat pipe principles. Heat pipes in which sodium serves as the thermodynamic working fluid are well suited for operation at 1400°-1800° F. and sodium heat pipes are capable of accepting heat at the relatively high power densities available within a fluidized bed. Sodium heat pipes are also capable of transferring the desired power of several kilowatts needed for a practical industrial or commercial power plant. Heat pipes have an intrinsically high thermal conductance and will therefore carry the power with a very small temperature loss. The result is a high efficiency heat exchanger which, in turn, permits the delivery of high temperature gas to the turbine, yielding high system efficiency.

The array of simple, cylindrical heat pipes permits ready circulation of the particles of the fluidized bed, preventing clogging and establishing a uniform temperature within the bed.

Each heat pipe is a self-contained, sealed heat transfer element independent of all others. The power plant employs several thousand such heat pipe elements in the heat exchanger. Therefore, the failure of an individual heat pipe will not cause a system failure, as would be the case with a conventional heat exchanger. The effect of the loss of a single element will be to increase the thermal resistance of the heat exchanger very slightly. For instance, if one thousand heat pipes are used, a single loss has an effect of only 0.1 percent, a negligible loss of efficiency. Failed heat pipes, if any, can be readily replaced during normal system shut-down periods when other regular maintenance is performed.

Moreover, the failure of a heat pipe will not permit working gas to escape from the closed cycle engine loop, nor fly ash to enter the engine inlet, because for this to happen it is necessary for both ends of the same heat pipe to be breached, a most unlikely occurance.

The heat pipes used in the system are, however, specially constructed to enhance their reliability in the severe conditions encountered within the fluidized bed. The heat pipes are protected from erosion, corrosion and gas permeation by constructing the heat pipe outer shells of steel upon which a thin layer of the oxides of aluminum, silicon or titanium of approximately one micron is produced.

This oxide layer is produced according to the teachings of U.S. Pat. No. 4,082,575 or U.S. Pat. application Ser. No. 169,659 by heating a steel with, for instance, an aluminum content of ½ to 5% to a temperature of 500° to 1000° C. for 1-10 hours. When heated in an air or oxygen atmosphere the oxide surface coating is continuous and water resistant, and when heated in a reducing atmosphere of hydrogen the oxide coating is also impermeable to hydrogen. The resulting heat pipe is therefore protected from the permeation by hydrogen and corrosion by moisture generally existing within the fluidized bed.

This thin oxide layer is itself protected from erosion due to the rapid motion of the fluidized bed particles by plasma spraying a second ceramic layer such as aluminum oxide over only the portion of the heat pipe immersed in the fluidized bed. This second protective ceramic layer is from 0.010 to 0.125 inch thick on the outside surface of the heat pipe casings.

The system of the invention will therefore provide high efficiency conversion of the combustion energy of coal to more useful forms of energy. It will perform this service without excessive atmospheric pollution, reliably and economically for an extended operating life in contrast to alternative systems made according to prior art.

DETAILED DESCRIPTION OF THE INVENTION

Figure 1:
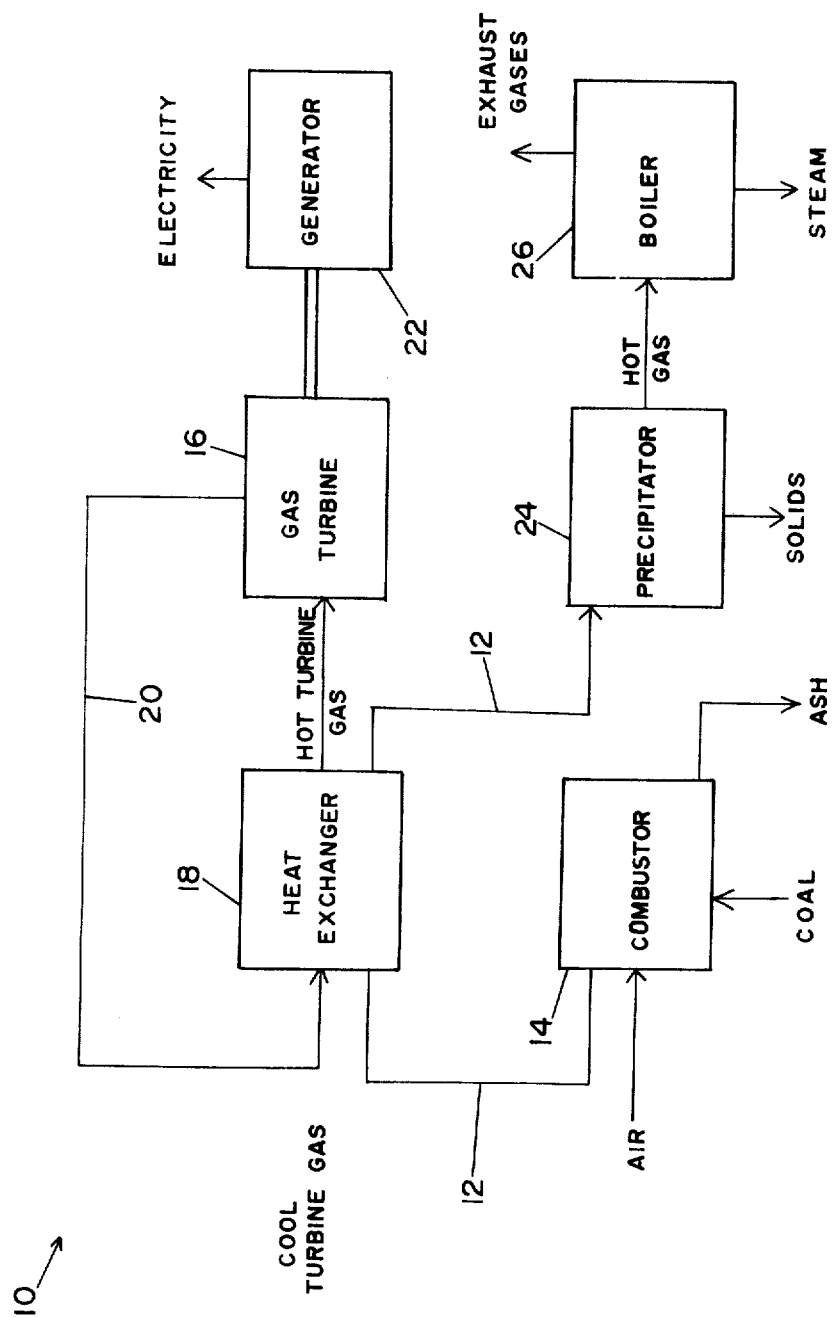
FIG. 1 is a simplified block diagram of the power plant of the invention.

The simplified block diagram of power plant 10 of the invention is shown in FIG. 1 where heat from combustion gases 12, resulting from burning coal in combustor 14 is used to heat the gas entering turbine 16 by the operation of heat exchanger 18. The hot gas powers gas turbine 16 before being returned by line 20 for reheating in heat exchanger 18. Gas turbine 16 mechanically drives generator 22 to produce distributable power in the form of electricity.

The combustion process taking place in combustor 14 uses coal and air fed to it to produce heat, combustion gases and ash.

The combustion gases 12 are passed through heat exchanger 18, and, after transferring a major portion of their heat to the turbine gas, pass into precipitator 24 which removes the remaining solid particles. The remaining heat energy in the exhaust gases is removed in boiler 26 and converted into vapor for auxiliary use, such as building heat, before the remaining gases are exhausted from the system. Boiler 26 is also usable to generate vapor for utilization in a low temperature vapor cycle turbine to produce additional mechanical energy for production of electricity.

Figure 2:
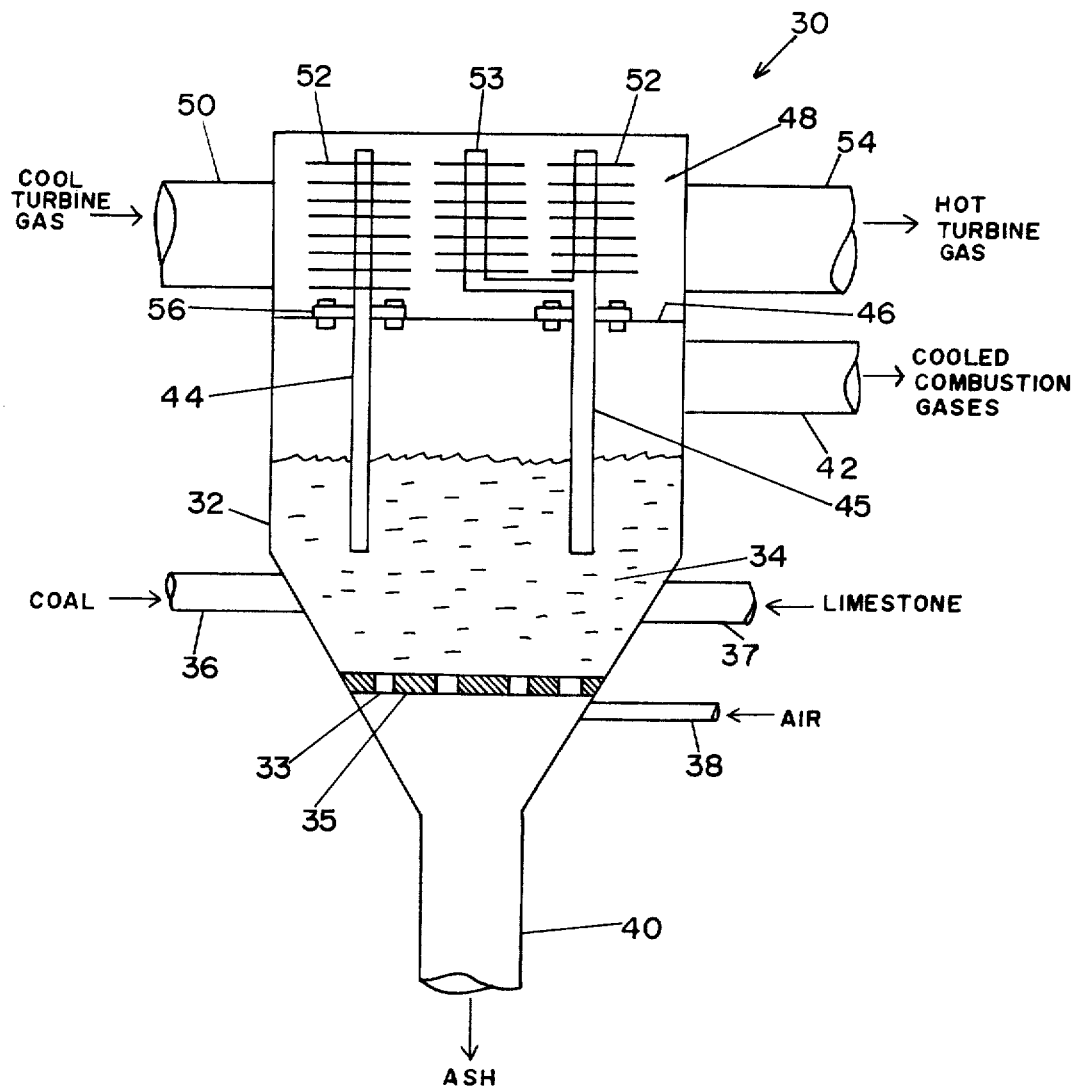
FIG. 2 is a simplified cross section side view of the preferred embodiment of the combustion chamber and heat transfer section of the invention.

FIG. 2 depicts the preferred embodiment of combustor 30 and heat exchanger 18 of the power plant which serve the vital functions of producing usable heat from coal, removing the sulphur contamination and transferring the heat to the turbine system.

All the functions are accomplished within vessel 32 within which fluidized bed 34 is burned. Fluidized bed 34 is continuously fed a suitable mixture of finely ground coal by means of feed pipe 36, and limestone, generally in place, can be replenished through pipe 37. Compressed air is supplied through pipe 38, while fluidized bed 34 is held in position by means of plate 35 with holes 33 through which the air passes. Fluidized bed 34 can be operated between 1500° and 1700° F. at which temperatures the sulphur in the coal combines with the lime to form heavy solid ash which falls down out of vessel 32 through discharge pipe 40.

Combustion gases exit vessel 32 above fluidized bed 34 through pipe 42, which, as shown in FIG. 1, delivers them to a precipitator for further cleansing.

The heat generated by the combustion of fluidized bed 34 is transferred to the turbine gas by means of vertical heat pipes 44 which pass through gas tight wall 46 which forms separate chamber 48 for turbine gas. Cold gas enters chamber 48 through duct 50, is heated by fins 52 attached to heat pipes 44 and 45, and exits to gas turbine 16 (FIG. 1) from duct 54.

By means of their well known heat transfer abilities, heat pipes 44 and 45 transfer heat from fluidized bed 34 to the turbine gas with very little change in temperature, thus permitting both the turbine and the fluidized bed to operate within their optimum temperatures, both in the same range of 1400° to 1700° F.

Gas-tight flanges 56 are used at the points at which heat pipes 44 and 45 penetrate wall 46 in order to both assure no leakage between the combustion gas system and the turbine system and to facilitate removal of the heat pipes for maintenance or replacement.

The preferred embodiment includes a very large quantity of heat pipes 44 and 45, which are not all shown for clarity of the drawing. The use of over one thousand such heat pipes is an assurance of reliable uninterrupted operation of the power plant since the failure of any one heat pipe by, for instance, puncture of the portion in the fluidized bed, is non-catastrophic and affects the power output by only a fraction of one percent. Since such failures are essentially not significant, the system can be operated without shutdown until normal maintenance shutdown occurs, at which time replacement can be made.

Heat pipe 45, shown in FIG. 2, is constructed similarly to heat pipe 44 except, while heat pipe 45 is depicted as a straight cylinder with one set of fins 52, heat pipe 45 is constructed with a branch section and a second set of fins 52. Such additional heat pipe condensing sections permit the balancing of the heat transfer characteristics within the input and output systems of heat pipe 45. Use of additional branches of virtually any number permits optimizing the heat transfer both at the input within fluidized bed 34 and the output at fins 52.

Figure 3:
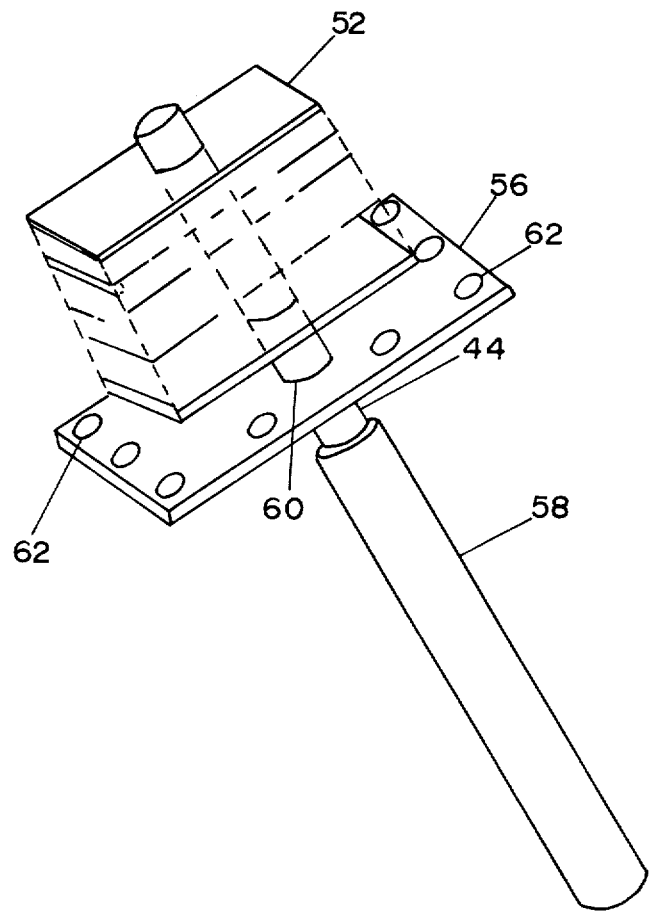
FIG. 3 is a perspective view of a specially constructed heat pipe of the invention.

As shown in FIG. 3, heat pipe 44 is of a novel construction to minimize pipe failures despite the extreme environment of the fluidized bed combustion chamber.

Heat pipe 44 of the preferred embodiment utilizes sodium as the working fluid to operate in the desired temperature range of 1500° to 1700° F., and is oriented vertically to permit wickless construction for economy. Heat pipe 44 is constructed of steel and has an impervious continuous, approximately one micron thick, external layer containing oxides of aluminum, titanium or silicon. The oxide layer prevents permeation of the heat pipe by hydrogen gas and corrosion by water vapor present in the combustion chamber. This thin oxide coating can be produced by known processes disclosed in the patent and patent application noted above and can be either a single pure oxide or contain all three oxides named.

Heat pipe 44 and the thin oxide coating are further protected from erosion by second ceramic coating 58 of between 0.010 and 0.125 inch thickness which is plasma sprayed onto that portion of heat pipe 44 to be immersed in the fluidized bed. This second ceramic coating is composed of oxides of aluminum, silicon, titanium, magnesium and calcium either in the pure form of a single oxide or with some mixture of oxides. Since its essential function is abrasion resistance, and the function of a permeation barrier is fulfilled by the thin continuous layer underneath, this second surface's purity is not critical.

Gas-tight flange 56 is attached to heat pipe 44 at junction 60 by conventional bonding methods such as welding and has bolt holes 62 for conventional leak-tight attachment to wall 46 (FIG. 2). The bolt-on construction makes rapid replacement of individual heat pipes possible during regular maintenance periods of the power plant.

The portion of heat pipe 44 on the opposite side of flange 56 has attached to it heat transfer fins 52 to enhance heat exchange to the turbine gas. These fins are attached by conventional methods, familiar to those skilled in the art of heat transfer, but it is of some interest to note that the thin oxide coating of approximately one micron has no significant effect on the heat transfer between the heat pipe and the fins.

Figure 4:
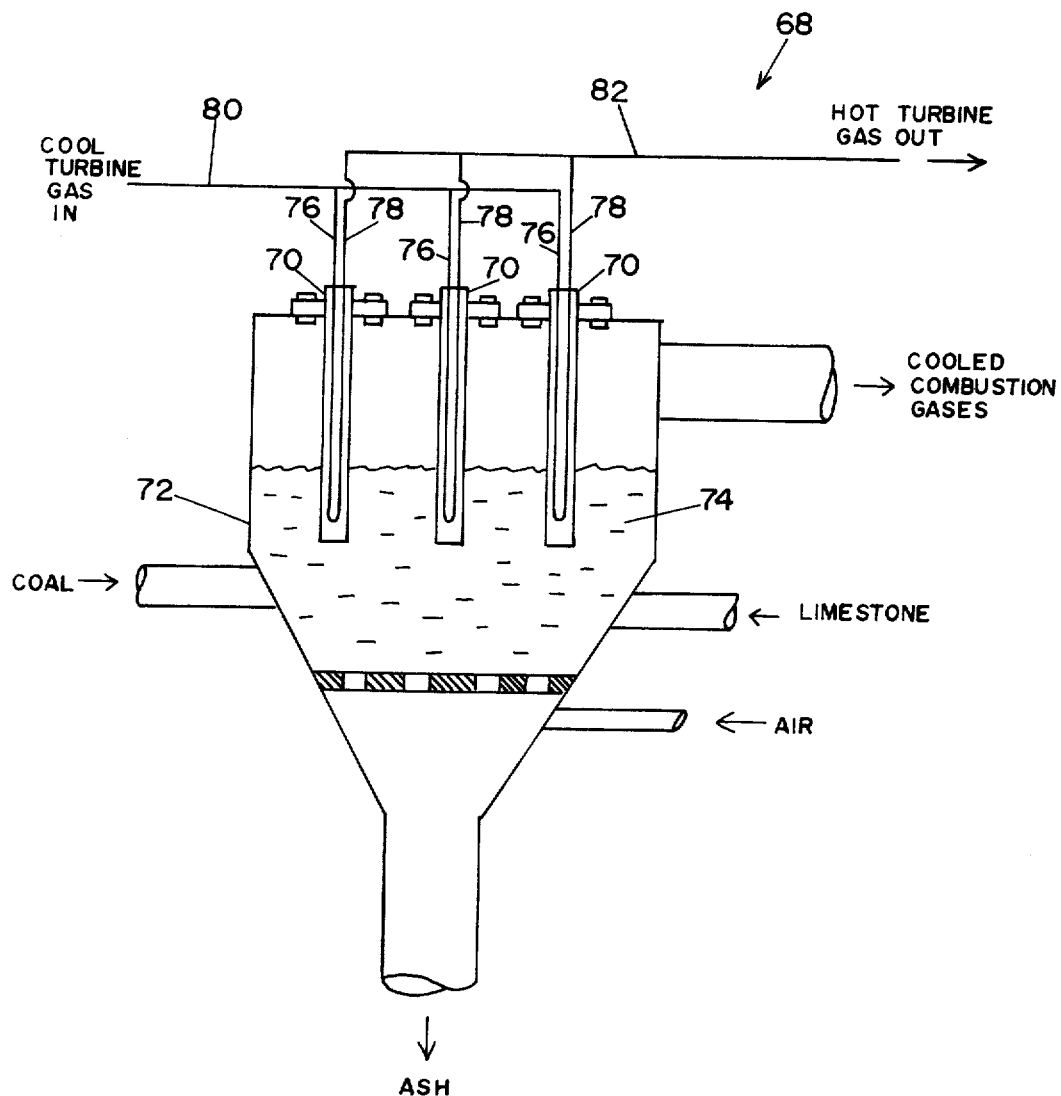
FIG. 4 is a cross sectional view of an alternate embodiment of the combustion chamber and heat transfer section of the invention.

FIG. 4 depicts an alternate embodiment 68 of the combustion chamber and heat transfer section in which heat pipes 70 themselves contain the system of heat transfer to the turbine gas, but in which the lower portion of combustion chamber 72 functions in the same manner as vessel 32 of FIG. 2.

Fluidized bed 74 is fed coal and limestone and combustion takes place within combustion chamber 72 creating heat in the same manner as before. However, to eliminate the requirement for a very large, high pressure chamber 48 (FIG. 2), high pressure gas for the turbine is fed into each individual heat pipe 70 by input piping 76. The gas, after heating as it passes through heat pipe 70, exits through output piping 78. Input piping 76 of many individual heat pipes 70 is fed from input manifold 80, and output piping 78 of many heat pipes is combined into output manifold 82. Since, as noted above, several thousand heat pipes are actually used, the total gas flow in manifolds 80 and 82 is sufficient for turbine drive even though the flow through each heat pipe is appropriate for the smaller size of input piping 76 and output piping 78. Moreover, the smaller size of the piping through heat pipes 70 make attaining high pressure integrity far simpler than with the large pressure chamber of FIG. 2.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, other methods of attachment of the heat pipes to the wall of the chamber can be used and the heat pipes may contain wicks or portions of wicks or be, as described, wickless. Also, potassium, lithium and certain molten salts could be used as heat pipe fluids and the mechanical energy of the turbine could be used for other mechanical purposes instead of generating electricity. Moreover, the heat exchanger could be oriented so that the heat pipes are horizontal or at some angle to the vertical without loss of the benefits of the invention, and ash can be removed by methods other than gravity fall-out, such as a conveyor system or batch unloading.

What is claimed as new and desired to be secured by Letters Patent of the United States is:

1. An apparatus for the production of mechanical power comprising:

a fluidized bed combustor into which air, coal and limestone are introduced and in which the coal is burned to create heat and the limestone chemically combines with any sulphur in the coal to produce solid compounds;

means attached to the combustor to remove the solid compounds produced by combination of the limestone and sulphur;

a closed cycle gas turbine using hot gas furnished to its input to create mechanical energy; and a heat exchanger, a first part of which is connected to the fluidized bed combustor and a second part of which is attached to the gas turbine input, heating the turbine gas prior to entry into the turbine, comprising multiple heat pipes constructed with casings with a coating of a continuous impermeable layer of oxide of approximately one micron thickness and a second ceramic coating of between 0.010 and 0.125 inch thickness, covering at least that portion of the heat pipes immersed in the fluidized bed.

2. The apparatus of claim 1 wherein the heat pipe casings are steel.

3. The apparatus of claim 1 wherein the impermeable layer of oxide is selected from the group consisting of aluminium, silicon and titanium.

4. The apparatus of claim 1 wherein the second ceramic coating is selected from a group consisting of the oxides of aluminium, silicon, titanium, magnesium and calcium.

5. The apparatus of claim 1 wherein the number of individual heat pipes used is greater than one thousand.

6. The apparatus of claim 1 wherein the combustor and the heat exchanger are constructed in a single vessel which includes a gas-tight barrier wall separating the turbine input from the combustor and wherein the heat pipes penetrate the gas-tight wall to transfer the heat to the turbine input.

7. The apparatus of claim 6 wherein the heat pipes are individually removable and replaceable by bonding to the gas-tight attachment means which are removably attached to the barrier wall.

8. The apparatus of claim 6 wherein the vessel is constructed with a configuration such that the second part of the heat exchanger is vertically above the fluidized bed combustor.

9. The apparatus of claim 1 wherein the second part of the heat exchanger comprises heat exchange fins attached to the heat output ends of the heat pipes mounted within a chamber through which the turbine gas flows.

10. The apparatus of claim 1 wherein the second part of the heat exchanger comprises piping, mounted internal to the heat pipes, through which the turbine gas flows.

11. The apparatus of claim 1 further including a precipitator to remove solids from the gases resulting from combustion.

12. The apparatus of claim 1 further including means to extract usable heat from the exhaust gases.

13. The apparatus of claim 1 further including an electrical generator mechanically coupled to the gas turbine and generating usable electrical power.

* * * * *